United States Patent [19]

Kobayashi et al.

[11] 4,124,550

[45] Nov. 7, 1978

[54] CLAY PIGEON

[75] Inventors: Takashi Kobayashi; Sakuya Iwai, both of Tokyo, Japan

[73] Assignee: Nippon Oil Co., Ltd., Japan

[21] Appl. No.: 696,919

[22] Filed: Jun. 17, 1976

[30] Foreign Application Priority Data

Jun. 20, 1975 [JP] Japan .................................. 50-75333
Jun. 27, 1975 [JP] Japan .................................. 50-79790
Oct. 14, 1975 [JP] Japan .................................. 50-123701

[51] Int. Cl.² ............................................. C08L 91/00
[52] U.S. Cl. .................................. 260/23.3; 106/241; 106/242; 260/27 R; 260/27 BB; 260/42.43; 260/42.46; 260/42.47; 273/105.4; 273/105.5

[58] Field of Search .............................. 204/59, 59.14; 260/23 R, 27 R, 47 EP, 47 UA, 51 R, 77.5 CR, 79.3 R, 478, 486, 651 R, 666 R, 27 EV, 27 BB, 26, 24, 40 R, 42.43, 42.47, 42.46, 42.52, 42.22, 23.3, 80 L, 85.3 R, 85.5 XA, 87.5 R, 93.1 R, 94.1 R, 94.9 R; 106/241, 242; 273/105.4, 105.5

[56] References Cited

U.S. PATENT DOCUMENTS 3,554,552   1/1971   Nixon et al. ...................... 273/105.4
3,676,386   7/1972   Brenner et al. ................... 260/27 R Primary Examiner—Melvyn I. Marquis
Attorney, Agent, or Firm—Weingarten, Maxham & Schurgin

[57] ABSTRACT

A clay pigeon used as a target in trapshooting or skeet shooting which is made by molding a composition comprising low molecular weight thermoplastic resin, high molecular weight thermoplastic resin and inorganic powdered filler, and if desired, additives, pigments and/or antioxidants are added to the composition. The clay pigeon is itself light colored without the need for a light coloring finish and contains no noxious material.

3 Claims, No Drawings

CLAY PIGEON

BACKGROUND OF THE INVENTION

This invention relates to a clay pigeon used as the target in trapshooting or skeet shooting. More particularly, the invention relates to an improved clay pigeon which is made by molding a composition comprising (1) 60 to 100 parts by weight of low molecular weight thermoplastic resin having average molecular weights of 300 – 3,000 and softening points (ring and ball method) of 60° – 200° C., (2) 0 – 40 parts by weight of high molecular weight thermoplastic resin having average molecular weights of 5,000 – 1,000,000 and (3) 100 – 900 parts by weight of inorganic powdered filler per 100 parts total of thermoplastic resin (i.e., the sum of the low and high molecular weight thermoplastic resins) and if necessary, small quantities of additives, pigments and antioxidants. Still further, the invention relates to an improved light colored clay pigeon which is made directly from the above-mentioned materials without requiring the application of a paint, coloring material or finish to provide a light-colored appearance. The materials used are harmless to human health and the environment.

The clay pigeon is shaped like a saucer, and is standardized with an outer diameter of 110 ± 2 mm, a height of 25 – 28 mm and a weight of 105 ± 5 g. It is hurled from a trap in the shooting; thus the desirable properties for this clay pigeon are that it not be broken when it is released from the trap, that it be easily visible to the naked eyes of a shooter, that its trajectory when so hurled is stable, and can be easily broken when hit with the shots at any part of the shot-colon (spreaded shots).

Clay pigeons are presently made by molding a black composite of tar pitch and lime, and by coating the outside with coloring material. However, the coal-tar pitch is liable to cause dermatitis when it is brought into contact with the skin. Further, it contains carcinogenic 3,4-benzpyrene and other noxious substances so that it causes harm to the persons concerned in that dust, powder and noxiuos gases are produced during the blending and molding of materials, or during the handling in shooting fields. Further, broken pieces and powder of material produced when clay pigeons are hit by shots become the source of environmental pollution for the inhabitants in neighbouring regions. Since the coal-tar pitch is black, the molded clay pigeons are also black and can not be used as they stand. A finish of light-colored material must be applied to the black units to make them more easily visible. This coloring or painting takes much time and trouble, and if the coloring is insufficient, they become hardly visible. In addition, since the powder coated on the surface of clay pigeons is scattered in a dust by a slight brush with shots fired by shooters in such a shooting game, disputes often rise between a shooter and referee in deciding whether or not any shot pellets hit a target.

Also, as a raw material for clay pigeons, in addition to coal-tar pitch, artificial or natural water ice may be employed as disclosed in U.S. Pat. Nos. 3,207,516 3,359,001 and 3,469,411, and further a sulfur containing material as described in Japanese Patent Application Disclosure No. 48-58699 may be used. However, the former takes too much time and labor for handling to release molded articles from a molding machine after molding, and the latter is narrowly restricted as to suitable molding conditions and may form sulfur compounds which emit a peculiar irritatve odor under heating.

BRIEF SUMMARY OF THE INVENTION

In view of the above-disclosed disadvantages, wide and extensive studies were performed and as the result, the present invention has been accomplished.

The primary object of the present invention is, therefore, to provide a quite novel and improved clay pigeon which is useful as a target in trapshooting and skeet shooting.

Another object of the present invention is to provide a clay pigeon which is produced from innoxious materials.

A further object of the present invention is to provide a light colored clay pigeon which is easily visible to shooters without the need for a separately applied coloring finish.

Still a further object of the present invention is to provide a clay pigeon which has excellent performance as compared with the conventional coal-tar pitch-clay pigeons.

According to the present invention, the clay pigeon of the present invention is made of a composition comprising (1) 60 to 100 parts by weight of low molecular weight thermoplastic resin having average molecular weights of 300 – 3,000 and softening points (ring and ball method) of 60° – 200° C., (2) 0 – 40 parts by weight of high molecular weight thermoplastic resin having average molecular weights of 5,000 – 1,000,000 and (3) 100 – 900 parts by weight of inorganic powdered filler per 100 parts of thermoplastic resin (i.e., the sum of the low and high molecular weight thermoplastic resins).

DETAILED DESCRIPTION OF THE INVENTION

As examples of the above-mentioned low molecular weight thermoplastic resins used in the present invention, there are petroleum resins and other low molecular weight thermoplastic resins.

The petroleum resins are those prepared by thermally or acid-catalytically polymerizing the multi-component unsaturated hydrocarbons containing olefins and diolefins which are obtained through thermal cracking of petroleum. For example, included in commercially available ones are aliphatic petroleum resins which are produced by thermally or catalytically polymerizing mainly $C_5$ fractions such as Escorez (trademark, sold by Esso Kagaku K.K. in Japan), Hi-Rez and Tack-Ace (trademarks, made by Mitsui Petrochemical Industries, Ltd.), Quintone(trademark, made by The Nippon Zeon Co., Ltd.), and Wing Tack (trademark, made by Goodyear Tire & Rubber Co.); aromatic petroleum resins which are produced by polymerizing mainly $C_9$ fractions such as Neopolymer (trademark, made by Nippon Petrochemicals Co., Ltd.) and Petrosin (trademark, made by Mitsui Petrochemical Industries, Ltd.); copolymer type petroleum resins produced by polymerizing $C_5$ (or $C_4$) and $C_9$ fractions such as Toho Hiresin (trademark, made by Toho Petroleum Resin Co., Ltd.); and Klyrvel (trademark, made by Versicol Chemical Corp.); hydrogenated petroleum resins such as Arkon (trademark, made by Arakawa Forest Chemical Industries, Ltd.) and Escorez 5000 series (trademark, sold by Esso Kagaku K.K.). Further included in the applicable petroleum resins are modified resins of the above with unsaturated polybasic acid such as maleic anhydride and, esterificated, hydrogenated or partially hydrogenated products of the above petroleum resins.

Exemplified as the above-mentioned thermoplastic resins applicable in the present invention are rosin, rosin esters prepared by using alcohols such as glycerol and pentaerythritol, hydrogenated or partially hydrogenated rosin, polyterpene resin, xylene resin and coumarone-indene resin, low molecular weight polystyrene, and their derivatives obtained for example by hydrogenation. The rosin herein referred to is natural rosin which is prepared by obtaining the resin components of wood through solvent extraction or steam distillation and refining them. The polyterpene resin is common one which is obtained by polymerizing terpentine oil such as α-pinene, β-pinene, and dipentene, etc., terpenes or the like. The xylene resin is prepared by heating xylenes and formaldehyde in the presence of strong acid catalyst. Further, the coumarone-indene resin is produced by polymerizing the fraction containing coumarons and indene.

The above-disclosed petroleum resins and other low molecular weight thermoplastic resins are preferably light colored ones. More particularly, when 20% by weight of resin is dissolved in a hydrocarbon solvent according to Standard method of test for color of transparent liquids Gardner color scale (ASTM D-1544-68), the Gardner color standard number may be less than 15.

In the case that higher grade white clay pigeons are required, light colored resins such as hydrogenated or partially hydrogenated aromatic petroleum resins, the petroleum resin as disclosed in item (1) of claim 1 of U.S. Pat. No. 3,778,421, hydrogenated rosin, and polyterpene resin can be used as low molecular weight thermoplastic resin.

The softening points of the above-disclosed resins are within the range of 60° to 200° C, and preferably 80° to 190° C, when they are measured according to the ring and ball method (Japanese Industrial Standard K 2531). When a resin having a softening point below 60° C is used, the thermal resistance of clay pigeons become insufficient. When such clay pigeons are left in a hot place or they are piled one atop another during their transportation and storage, they may become deformed or the sticky surfaces of the molded articles may adhere together causing them to aggregate into one body. Though it is difficult to raise the softening point above 200° C, when the softening point of the above-disclosed resin is raised above 200° C the melt viscosity becomes high which disadvantageously reduces the workability of the resin.

These low molecular weight thermoplastic resins have number average molecular weights from 300 to 3,000, preferably 500 to 2,000.

In addition to the above low molecular weight thermoplastic resin, high molecular weight thermoplastic resins may be desirably used for the object of the present invention. The high molecular weight thermoplastic resin referred in the present invention has a number average molecular weight ranging from 5,000 to 1,000,000 preferably 10,000 to 500,000 and includes high molecular weight thermoplastic resins such as polyethylene, polypropylene, polybutene-1, crystal 1,2-polybutadiene, polystyrene, poly-α-methylstyrene, polyvinyl chloride, polymethyl methacrylate, polyamide, polyester, thermoplastic polyurethane, etc.; those of copolymer type such as ethylene-propylene block copolymers, ethylene-vinyl acetate copolymers, ethylene-ethyl acrylate copolymers, styrene-butadiene block copolymers, styrene-isoprene block copolymers, etc. Particularly, polyethylene, polypropylene and polystyrene, which are cheap and effectively improve physical properties, may be preferably used. These high molecular weight thermoplastic resins are effective for satisfying two requirements for clay pigeons such as a good fragility i.e., the targets are easily dispersed into small pieces when hit by shot pellets and the property that they are not broken in the molding operation, in handling during transportation and by any shock on being released from traps.

The inorganic powdered fillers applicable in the present invention are inorganic powder of 0.01 to 500 microns in particle size, which may be exemplified by calcium carbonate, talc, clay, alumina white, mica powder, aluminum sulfate, barium sulfate, gypsums, calcium sulfite, lithopone, pumice powder, glass powder, zinc white, magnesium carbonate, metal powder, asbestos powder, titanium oxide and mixtures of them. Since clay pigeons are relatively inexpensive and the aforementioned features are required, coarse powders of heavy calcium carbonate and clay are preferable as the inorganic powdered fillers used in the present invention.

The compounding ratio of the above-disclosed resin material and inorganic powdered filler is:

100 to 900 parts, preferably 200 to 850 parts by weight of inorganic powdered fillers to 100 parts by weight of a thermoplastic resin component comprising 60 to 100 parts, preferably 70 to 98 parts by weight of low molecular weight thermoplastic resin and 0 to 40 parts, preferably 2 to 30 parts by weight of high molecular weight thermoplastic resin.

In view of the above-mentioned standards of shape and weight of clay pigeons, the compounding ratio is restricted to some extend according to the specific gravities of the resin material and the inorganic filler. When less than 100 parts by weight of the filler is contained, the workability of composites and the performance of the products become unsatisfactory; that is, since the thermal resistance is not good enough, when the clay pigeons are kept piled up or stored in the summer, they are liable to stick together. Further, the clay pigeons become brittle and often they are broken when they are released from traps in trapshooting, which gives unpleasant feeling and trouble to shooters.

In the case that the amount of the inorganic filler is more than 900 parts by weight, the melt viscosity of the composite becomes very high and the fluidity is lost so that the molding or shaping becomes difficult or impossible. Further, in the present invention, the amount of high molecular weight thermoplastic resin combined in a small amount with 60 to 100 parts by weight of low molecular weight thermoplastic resin is in the range of from 0 to 40 parts by weight, and the optimum addition quantity thereof is varied depending upon the properties of the resin itself selected from such various high molecular weight thermoplastic resins as exemplified before. In other words, the quantity to be added of high molecular weight thermoplastic resins having a good impact strength is preferably 0 to 20% by weight and that of those having a smaller impact strength is preferably 5 to 40% by weight. When the high molecular weight thermoplastic resin is added in an amount of more than 40% by weight, the clay pigeon formed is so strong that it is not broken even by a direct hit, even if broken, it is not smashed in small pieces. Such clay pigeons are rejected by shooters as defective.

To the composition of the present invention for producing clay pigeons can be added, as needed, small quantities of, for example, less than 10% by weight of additives, pigments and/or antioxidants. As the additives, lubricants such as stearic acid, a metal salt thereof such as calcium stearate and wax which are used in the conventional molding operation of plastics, can be employed. Particularly, among these, stearic acid is a useful lubricant, and the addition of 0.2 to 2.0% by weight increases the workability of molding. Though the clay pigeons of the present invention are light colored, when whiter ones are desired, white pigment such as titanium oxide may be added to the composition, while if yellow ones are required, some yellow pigment is also used. Still further, the clay pigeons may be colored in contrast with the background of the shooting field by using suitable pigments.

The materials for preparing the composition can be easily mixed by using common mixing machines such as a kneader, Henschel mixer, Banbury mixer and mixing roll which are widely used for mixing plastic and rubber materials. Since the composition of the present invention is excellent in fluidity under heated conditions, it can be easily blended uniformly at 120° to 250° C by using a simple mixer having a heating device. In the formation of clay pigeons, well known molding methods such as compression molding, injection molding and casting are used. Further, the above-disclosed composition is powdered, granulated or pelletized before it is fed into the molding machine. Furthermore, the heating and blending step can be accomplished in the molding process by using an injection molding machine having a premixing-preplasticizing device such as an injection molding machine with a blend-feeder, in which the powdered materials can be dry-blended previously.

In order that those skilled in the art may better understand the present invention and the manner in which it may be practised, the following specific examples are given.

EXAMPLES 1 to 4 AND COMPARATIVE EXAMPLES 1 TO 3

The petroleum resins and inorganic powdered fillers shown in the following Table 1 were respectively weighed and they were kneaded together for about 10 minutes with kneaders heated at 120° to 200° C to obtain uniform compositions for clay pigeons. The compositions were allowed to cool and then were granulated by a crusher. The granular compositions were subjected to compression molding at 150° C to obtain clay pigeons. The clay pigeons were put to several tests, the results of which are shown in the lower part of Table 1. Taking the condition under the blazing sun in summer into consideration, it is understood from Table 1 that the self-supporting thermal resistance of the clay pigeons must be 60° C or above. The compressive strength of the coal-tar pitch clay pigeons presently used in trap-shooting is about 2.5 to 3.5 Kg. In view of the above, the clay pigeons of Examples 1 to 4 and Comparative Examples 1 to 3 were judged. The clay pigeons of Examples 1 to 4 satisfied the above conditions and the workabilities of the compositions were equal to or better than those of the conventional ones (coal-tar pitch-lime blend).

Further, the obtained clay pigeons of the invention were also excellent in that they were not broken when they were released from a trap, they were easily visible, flight lines were stable, and in addition, they were easily broken when they were hit by shots.

In Comparative Example 1, since the quantity of filler was small, the material was brittle and much breakage was caused to occur during the molding. The compressive strength was below 2.0 Kg.

In Comparative Example 2, the quantity of petroleum resin was very small with 95% by weight of filler, so that the composition was loose and the molding was impossible.

In Comparative Example 3, the composition was almost the same as that of a clay pigeon presently used and made of coal-tar pitch, however, it emitted a yellow smoke with irritative odor on melting and blending. It was very harmful to persons engaged in blending and molding, and fears were entertained that it would cause great environment pollution. Further, the clay pigeon made of coal-tar pitch was required to be painted white on the surface after molding so that it might be easily visible to shooters, but this cost much labor. Also, even when only one pellet of shot hit and penetrated through the clay pigeon, it was difficult for referees to confirm the fact, since the broken pieces were black. As the result, they were often forced to judge a hit to be a miss or failure. This was one of the defects in the performance of such a clay pigeon at the time of being hit.

Table 1

| Example No. Item | Example 1 | 2 | 3 | 4 | Comparative Example 1 | 2 | 3 |
|---|---|---|---|---|---|---|---|
| Petroleum resin/filler (wt%) | | | | | | | |
| Petroleum resins | | | | | | | |
| Petroleum resin(*3) (softening pt. 95° C) | 19 | — | 10 | 24 | 40 | 5 | — |
| Petroleum resin(*4) (softening pt. 115° C) | — | 20 | 10 | — | 20 | — | — |
| Coal-tar pitch (softening pt. 98° C) | — | — | — | — | — | — | 35 |
| Fillers | | | | | | | |
| Calcium carbonate | 80 | 80 | 80 | 75 | 40 | 90 | 65 |
| Titanium oxide | 1 | — | — | 1 | — | 5 | — |
| Properties of clay pigeons | | | | | | | |
| Self-supporting thermal resistance (° C)(*1) | 79 | 80 | 82 | 73 | 76 | — | 83 |
| Compressive strength (Kg)(*2) | 3.3 | 2.7 | 3.1 | 2.7 | <2.0 | — | 3.2 |
| Workability | Good | Good | Good | Good | Poor | Impossible | Good |
| Color of clay pigeon | Mill-white | White | Light yellow | Milk-white | Yellow | — | Black |

Table 1-continued

| Example No. | Example | | | | Comparative Example | | |
|---|---|---|---|---|---|---|---|
| Item | 1 | 2 | 3 | 4 | 1 | 2 | 3 |
| Overall evaluation | Pass | Pass | Pass | Pass | Fail | — | Fail |

[*1] A clay pigeon is loaded with 1 Kg weight and the temperature of surrounding air is raised at a rate of 2° C/min. from the starting temperature of 20° C. The temperature at which clay pigeon begins to deform is measured.
[*2] A clay pigeon is placed on a pair of round bars (8mm in radius and 85 mm distance apart) and a blade having an 8mm radius edge is pressed down at a speed of 500mm/min. against the center of the clay pigeon. The strength at which the clay pigeon crushes is measured.
[*3] Aromatic petroleum resin, Nisseki Neopolymer T (trademark)
[*4] Hydrogenated petroleum resin, Akron P115 (trademark)

EXAMPLES 5 TO 8 AND COMPARATIVE EXAMPLES 4 TO 6

The low molecular weight thermoplastic resins and inorganic powdered fillers indicated in the following Table 2 were weighed and blended together for about 10 minutes with kneaders that were heated at 120° to 200° C to obtain uniform compositions for producing clay pigeons. The compositions were then allowed to cool and pelletized by crushing with a crusher. The compositons were subjected to compression molding at 150° C to obtain clay pigeons and the clay pigeons were put to several tests, the results of which are shown in the following Table 2.

The clay pigeons produced according to the present invention were excellent also in these examples in that the thermal resistance, compressive strenghts, and workabilities of them were good. Further, they were easily visible and stably thrown by a trap.

In Comparative Example 4, thermoplastic resin of low softening point was used. Since the composition stuck to the mold surface, the releasing from the mold was difficult and the thermal resistance was not good.

In Comparative Example 5, since the quantity of filler was small, the material was brittle and much breakage was caused to occur during the molding. The compressive strength was below 2.5 Kg.

In Comparative Example 6, the quantity of thermoplastic resin was very small and 95% by weight was filler, so that the composition was loose and the molding of clay pigeons was impossible.

uniform compositions for clay pigeons. After standing cool, these compositions were pelletized or powdered with a crusher to obtain clay pigeons by compression molding at 150° – 180° C, but in Example 9, they were molded by injection molding at 120° – 180° C. These clay pigeons were tested and the results are shown in the lower part of the table.

Breaking tests at the time of release were repeated three to five times by using these clay pigeons in terms of hundreds each, and the dispersion of numbers of those broken on release was averaged. The state of broken pieces produced by a hit was examined by actually shooting clay pigeons during the test. The results are represented by the following symbols:
  when the broken pieces were small in form .... ⊚,
  when broken pieces were large in form and continued to fly .... Δ, and
  when the state of broken pieces was between the above measures ... ○.

The thermal resistance was determined by observing the change of state of a sample clay pigeon when it was loaded with 1 Kg weight and ambient temperature was raised at a rate of 2° C/min., starting at 25° C. When the clay pigeon started to deform at a temperature below 60° C, the thermal resistance was designated "poor", whereas when it maintained the original form at a temperature above 60° C, the thermal resistance was represented as "good". In Examples 9 – 13 and Comparative Examples 7 – 9, the suitability for clay pigeons was decided on the basis of these standards of judgement.

Table 2

| Example No. | Example | | | | Comparative Example | | |
|---|---|---|---|---|---|---|---|
| Item | 5 | 6 | 7 | 8 | 4 | 5 | 6 |
| Thermoplastic resin/filler (wt%) | | | | | | | |
| Thermoplastic resins | | | | | | | |
| Polyterpene resin (softening pt. 100° C) | 20 | — | 10 | 25 | — | 60 | 5 |
| Polyterpene resin (softening pt. 40° C) | — | — | — | — | 20 | — | — |
| Pentaerythritol ester of partially hydrogenated rosin (softening pt. 84° C) | — | 20 | 10 | — | — | — | — |
| Fillers | | | | | | | |
| Calcium carbonate | 80 | 80 | 75 | 70 | 80 | 40 | 90 |
| Titanium oxide | — | — | 5 | 5 | — | — | 5 |
| Properties of clay pigeons | | | | | | | |
| Self-supporting thermal resistance (° C) | 81 | 72 | 75 | 77 | <40 | 70 | — |
| Compressive strength (Kg) | 3.0 | 3.3 | 3.2 | 2.9 | 4.0 | 2.2 | — |
| Workability | Good | Good | Good | Good | Poor | Poor | Impossible |
| Color of clay pigeon | Light yellow | Light yellow | Good | White white | Milk-yellow | Light | Yellow |
| Overall evaluation | Pass | Pass | Pass | Pass | Fail | Fail | — |

EXAMPLES 9–13 AND COMPARATIVE EXAMPLES 7 – 9

Low molecular weight thermoplastic resin, high molecular weight thermoplastic resin and inorganic powdered filler were respectively weighed in proportions shown in Table 3 and were kneaded for about 10 minutes with a kneader heated to 120° – 200° C to prepare Clay pigeons prepared in Examples 9 – 13 were found to be pale or white in color, to be easily visible to shooters and few of them were broken at the time of release. Moreover, they were highly spoken of because the feeling of rupture at the time of hit was unprecedentedly superior.

In Comparative Example 7, clay pigeons were prepared by molding compositions containing low molecular weight thermoplastic resin having a softening point (ring and ball method) of 40° C, but the cooling process after molding required much time. In addition, when the molded articles were packed in piles in lots of twenty-five, they were found to be stuck to each other and to be deformed by their own weight on the following day. Accordingly, it was impossible to evaluate their properties by projection.

In Comparative Example 8, a greater quantity of high molecular weight thermoplastic resin was incorporated. The molded articles were superior in breakage on release, thermal resistance, etc., but the extent of breakage at the time of hit was undesirable. Accordingly, they were unsuitable.

In Comparative Example 9, since a small amount of filler was used, the molded articles were too fragile. When the package was unpacked after transportation to a shooting field, the majority of clay pigeons were found to have been cracked. The thermal resistant temperature was 60° C or so. They were unsuitable for storage in summer or for use in tropical areas.

Table 3

| Example No.<br>Item | Example | | | | | Comparative Example | | |
|---|---|---|---|---|---|---|---|---|
| | 9 | 10 | 11 | 12 | 13 | 7 | 8 | 9 |
| Thermoplastic resin (wt %)<br>Low Molecular weight thermoplastic resin<br>(softening point, °C., ring and ball method) | Aromatic petroleum resin | Hydrogenated aromatic petroleum resin | Polyterpene resin | Rosin | Aliphatic petroleum resin | Polyterpene resin | Aromatic petroleum resin | Aliphatic petroleum resin |
| | (95)<br>80 | (100)<br>90 | (100)<br>95 | (80)<br>70 | (95)<br>97 | (40)<br>95 | (95)<br>50 | (95)<br>95 |
| High molecular weight Thermoplastic resin | Polystyrene | H.D. Polyethylene | Polypropylene | Polystyrene | Ethylene-vinyl acetate copolymer | Polypropylene | Polystyrene | Polystyrene |
| | 20 | 10 | 5 | 30 | 3 | 5 | 50 | 5 |
| Other components to 100 parts of resin, parts by weight | | | | | | | | |
| Inorganic powdered filler (heavy calcium carbonate) | 400 | 400 | 230 | 400 | 570 | 230 | 400 | 80 |
| Processing aid | Stearic acid$_3$ | — | Stearic acid$_2$ | Stearic acid$_3$ | Stearic acid$_5$ | Stearic acid$_2$ | Stearic acid$_3$ | Stearic acid$_2$ |
| Pigment | Titanium oxide$_3$ | — | — | — | Titanium oxide$_2$ | — | Titanium oxide$_3$ | Titanium oxide$_3$ |
| Properties of clay pigeon | | | | | | | | |
| Rate of breakage on release (%) | 0 - 1 | 0 - 2 | 1 - 2 | 0 - 1 | 0 - 1 | — | 0 - 1 | — |
| State of broken pieces at time of hit | ◎ | ○ | ◎ | ○ | ○ | — | △ | — |
| Thermal resistance (under load of 1 kg) | Good | Good | Good | Good | Good | Poor | Good | Poor |
| Color of clay pigeon | Milky white | White | Pale yellow | Yellow | White | Pale yellow | Milky white | Pale yellow |

Although the present invention has been described in connection with preferred examples thereof, many variations and modifications will now become apparent to those skilled in the art. It is preferred, therefore, that the present invention be limited not by the specific disclosure herein, but only by the appended claims.

What is claimed is:

1. A clay pigeon for use as a target in trapshooting or skeetshooting molded from a composition comprised of:

60 to 100 parts by weight of at least one member of low molecular weight thermoplastic resin having an average molecular weight of 300–3000 and a softening point, determined by the ring and ball method, of 60°–200° C, selected from the group consisting of petroleum resin, rosin, rosin esters, polyterpene resin, xylene resin, coumaron-indene resin, low molecular weight polystyrene and their hydrogenated derivatives;

0–40 parts by weight of at least one member of high molecular weight thermoplastic resin having an average molecular weight of 5000–1,000,000, selected from the group consisting of polyethylene, polypropylene, poly-butene-1, 1-2 polybutadiene, polystyrene, poly-α-methyl styrene, polyvinyl chloride, polymethyl methacrylate, polyamide resin, polyester resin, thermoplastic polyurethane, ethylene-propylene block copolymer, ethylenevinylacetate copolymer, ethylene-ethylacrylate copolymer, styrene-butadiene block copolymer and styrene-isoprene block copolymer; and 100–900 parts by weight of inorganic powdered filler per 100 parts of the total amount of the low molecular weight and high molecular weight thermoplastic resins.

2. The clay pigeon described in claim 1, wherein said inorganic powdered filler is at least one member selected from the group consisting of calcium carbonate, talc, clay, alumina white, mica powder, aluminum sulfate, barium sulfate, gypsum, calcium sulfite, lithopone, pumice powder, glass powder, zinc white, magnesium carbonate, metal powder, asbestos powder and titanium oxide.

3. A clay pigeon for use as a target in trapshooting or skeet-shotting molded from a composition comprised of:

70 to 98 parts by weight of low molecular weight thermoplastic resin having an average molecular weight of 500–2000 and a softening point, determined by the ring and ball method, of 80°–190° C;

2–30 parts by weight of high molecular weight thermoplastic resin having an average molecular weight of 10,000–500,000; and 200–800 parts by weight of inorganic powdered filler per 100 parts of the total amount of the low molecular weight and high molecular weight thermosplastic resins.

* * * * *

UNITED STATES PATENT AND TRADEMARK OFFICE
CERTIFICATE OF CORRECTION

PATENT NO. : 4,124,550
DATED : November 7, 1978
INVENTOR(S) : Takashi Kobayashi et al It is certified that error appears in the above-identified patent and that said Letters Patent are hereby corrected as shown below:

```
Column 1, line 43, "noxiuos" should read --noxious--.
Column 4, line 36, "extend" should read --extent--.
Column 5. line 67, "Mill-" should read -- Milk- --.

line 21, "compositons" should read --compositions--;
          line 27, "strenghts" should read --strengths--;
          Table 2, Example 7, line 62, insert --White--.
Column 8, Table 2, Example 8, line 62, "White" should read
-- Milk- --;
          Table 2, Example 4, line 62, "Milk-" should read
--Light--;
          Table 2, Example 5, line 62, "Light" should read
--Yellow--;
          Table 2, Example 6, line 62, delete "Yellow".
Column 10, line 53, "shotting" should read -- shooting--.
```

Signed and Sealed this

Nineteenth Day of June 1979

[SEAL]

Attest:

RUTH C. MASON
*Attesting Officer*

DONALD W. BANNER
*Commissioner of Patents and Trademarks*